United States Patent [19]

Akkerman et al.

[11] 4,225,110

[45] Sep. 30, 1980

[54] ACTUATOR FOR CONVERTING LINEAR TO ROTARY MOTION

[75] Inventors: Neil H. Akkerman, Kingwood, Tex.; Stephen R. Foster, New Orleans, La.; Gonzalo Vazquez, Houston, Tex.

[73] Assignee: Baker GAC Inc., Belle Chasse, La.

[21] Appl. No.: 946,233

[22] Filed: Sep. 27, 1978

[51] Int. Cl.[3] ........................................ F16K 31/122

[52] U.S. Cl. ........................................ 251/58; 74/25; 74/110; 92/13.3; 92/68; 92/137; 251/229; 251/294

[58] Field of Search ................. 92/13.3, 13.5, 68, 136, 92/137; 74/25, 110; 251/58, 229, 294

[56] References Cited

U.S. PATENT DOCUMENTS

| | | | |
|---|---|---|---|
| 3,056,573 | 10/1962 | Matheson et al. | 251/58 |
| 3,148,595 | 9/1964 | Looney | 92/68 |
| 3,156,160 | 11/1964 | Meyer et al. | 92/68 |
| 3,190,190 | 6/1965 | Rudd et al. | 92/68 |
| 3,267,816 | 8/1966 | Graham | 92/68 |
| 3,267,817 | 8/1966 | Adams | 92/68 |
| 3,384,057 | 5/1968 | Boone | 74/25 |
| 3,480,200 | 11/1969 | Rohrer | 92/137 |
| 3,709,105 | 1/1973 | Ridley | 92/137 |
| 3,831,500 | 8/1974 | Kitamura et al. | 92/68 |
| 3,982,725 | 9/1976 | Clark | 251/58 |

*Primary Examiner*—Martin P. Schwadron

*Assistant Examiner*—G. L. Walton

*Attorney, Agent, or Firm*—William C. Norvell, Jr.

[57] ABSTRACT

An actuator is provided for converting linear to rotary motion to manipulate a valve. Preferably, the actuator has a rotor which is rotatable about an axis and is operably associatable with the valve member. A pair of motors, preferably actuated by pressure fluid, each includes a reciprocal push rod assembly. Flexible means are coupled between the push rod assemblies of the motors and spaced apart points on the rotor such that when one of the motors is actuated, the respective one of the push rod assemblies is moved linearly in a direction to transmit torque to the rotor, thus causing the rotor to rotate about its axis in one direction and manipulate the valve member to one of open and closed positions, and when the other of the motors is actuated, the other of the push rod assemblies is moved linearly in an opposing direction to transmit torque to the rotor whereby the rotor is rotated about its axis in an opposite direction to manipulate the valve to the other of open and closed positions. The flexible means provides a constant torque output and transmits a force to the rotor which is equal to and opposite of the resistance of the valve member. A rotational stop element is provided for transmission of excess piston force for each of the rod assemblies. The rod assemblies also eliminates side loading forces to each of the pistons.

15 Claims, 4 Drawing Figures

ACTUATOR FOR CONVERTING LINEAR TO ROTARY MOTION

BACKGROUND OF THE INVENTION

1. Field of the Invention

The invention relates to a fluid actuated device for converting linear-to-rotary motion capable of delivering a constant torque output without a side thrust force vector being imposed upon on the driving piston.

2. Description of the Prior Art

A number of known thrust generating devices for converting linear motion to rotary motion are commercially available. However, each of the known devices has certain inherent problems.

For example, the conventional crank arm system has an inherent torque output capacity which is not constant. The torque output is at its lowest point at the beginning and end of each stroke of a crank arm system. This is undesirable in the utilization of this system in the actuation of rotary valves, for example, where the valve resistance is greatest at the beginning and the end of each cycle during the opening and closing thereof. By varying the length of the connecting rod in proportion to the radius of the valve motor, the torque curve may be changed. Additionally, in the event the connecting rod length is shortened to improve the torque curve of the system, the side thrust imposed on the actuating piston is increased. The increased side thrust on the actuating piston thus increases the wear on the piston and shortens the operating life of the system.

Another system heretofore utilized is the conventional rack and pinion system wherein only a few teeth of the rack and pinion gears are engaged at any given time and therefore are highly stressed under conditions requiring high torque output. If long life and efficient operation are required for such a system, the rack and the associated pinion must be aligned with extreme precision, at all times. Under high torque requirements, the rack and pinion system, including the operator therefor, must be enlarged. Accordingly, alignment becomes increasingly important. Manifestly, under high loading conditions, distortions may cause significant misalignment of the cooperating elements. Precision alignment of the associated piston, cylinder, and gears is necessary, and if not maintained, may result in undue seal, piston, cylinder, and gear wear. In order to maintain a constant torque output curve, a rack and pinion type actuating system must employ thrust bearings in order to assure proper alignment.

The scotch yoke mechanism is another well known torque generating device for converting linear motion into rotary motion. Typically, this system converts linear movement of a fluid pressure actuated piston and piston rod by a cam follower being integrally affixed to the piston rod and adapted to slide in a slot in a rotatable lever arm. The torque output curve normally is nonlinear and closely matches the torque requirements of typical valves. Due to the inherent and substantial side thrust characteristics of the scotch yoke mechanism, fluid pressure actuators must incorporate costly thrust bearings and large piston-cylinder clearances to prevent excessive piston wear. Clearly, thrust bearings effect the overall efficiency of the system thereby reducing torque available and necessary for operation of the actuator and manipulation of the valve.

Another torque generating device is a vane mechanism utilizing an impeller. In order for the impeller to function properly, the integrity of the seal between the impeller and the associated cylinder wall must be carefully maintained. Because of the complex design and sealing problems of the vane mechanism, the device may require frequent servicing.

The present invention provides a device for converting linear to rotary motion with reliable opening and closing forces for plug or ball type valves. This device is compact in design and provides a constant high torque output characteristic by utilizing a fluid pressure actuated motor having a piston which does not experience side loading forces and thus minimizes the wear of the piston seal assembly and the piston and cylinder areas. Furthermore, the apparatus of the present invention is completely sealed to protect the operating elements from external contamination and operating personnel from injury from moving parts.

SUMMARY OF THE INVENTION

An actuator is provided for converting linear to rotary motion which preferably includes a rotor rotatable about an axis, a pair of spaced apart motors including reciprocable push rod assemblies, and flexible means coupled between respective push rod assemblies of the motors and annularly spaced apart points on the rotor whereby when one of the motors is actuated the respective one of the push rod assemblies is moved linearly in a direction to transmit torque to the rotor causing the rotor to rotate about its axis in one direction and when the other of the motors is actuated the other of the push rod assemblies is moved linearly in an opposing direction to transmit torque to the rotor causing the rotor to rotate about its axis in an opposite direction, the flexible band assuring direct alignment of the line of action with the axis of the push rod to eliminate side force vectors to an associated piston.

DESCRIPTION OF THE PREFERRED EMBODIMENTS

Figure 1:
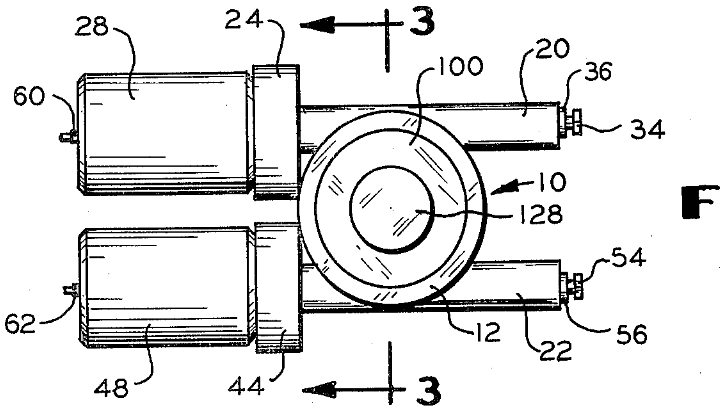
FIG. 1 is a top planar view of a ball valve assembly and actuator incorporating the features of the invention.
Figure 2:
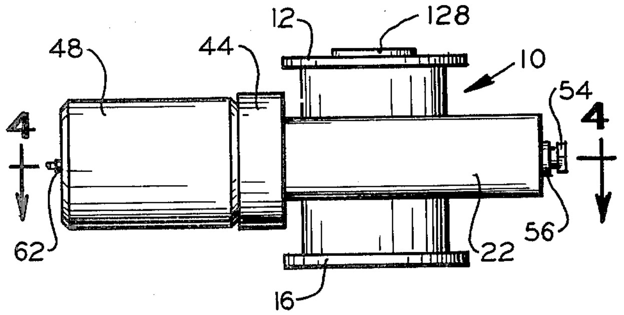
FIG. 2 is an elevational view of the apparatus illustrated in FIG. 1.
Figure 3:
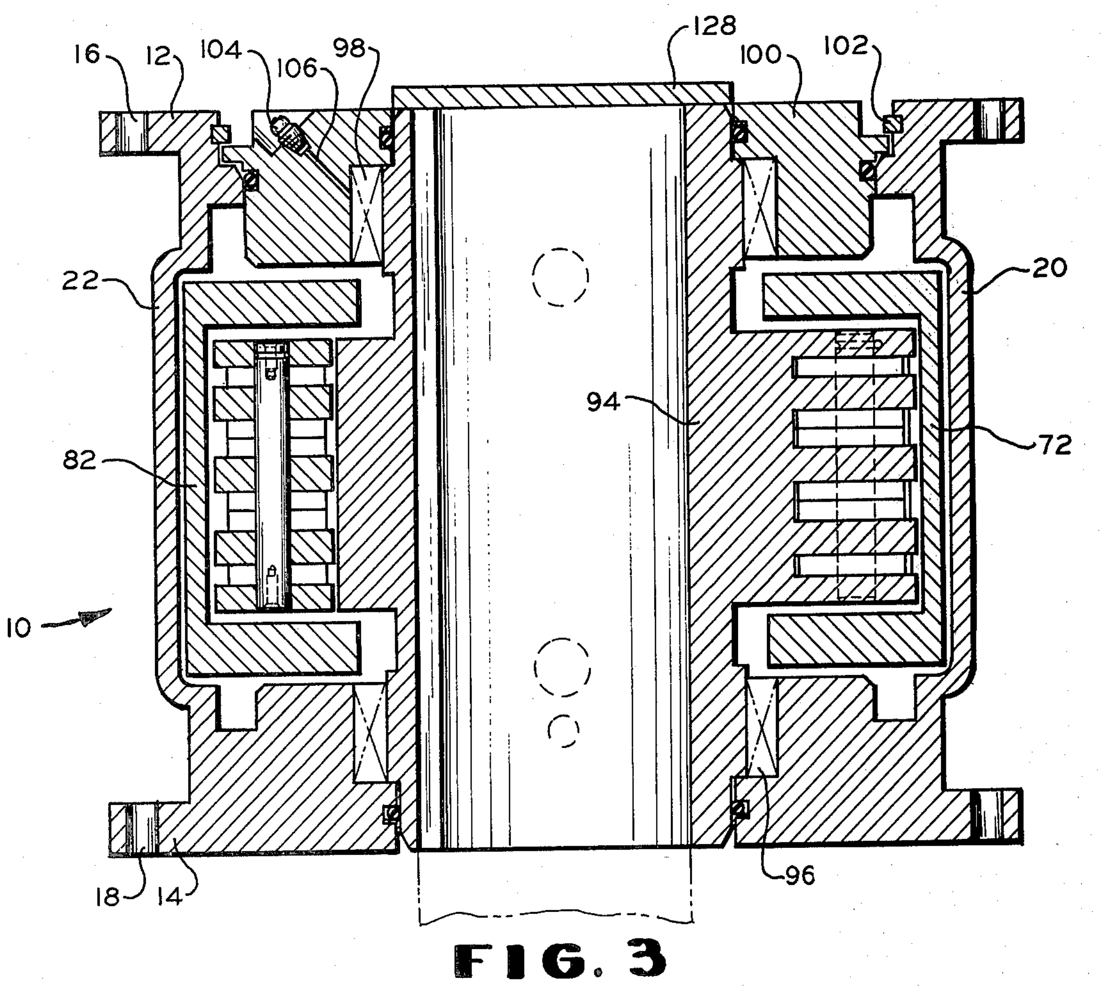
FIG. 3 is an enlarged sectional view of the apparatus illustrated in FIGS. 1 and 2 along line 3—3 of FIG. 1.

The valve actuator apparatus of the present invention includes a main housing 10 having an upper mounting flange 12 and a lower mounting flange 14, both being generally circular in shape. The upper mounting flange 12 has an annular array of apertures 16 and the lower mounting flange 14 has a similar array of apertures 18 which may be used for securing the device in the desired position, or may be used to secure the apparatus in stacked series relationship in the event increased torque output requirements are deemed necessary.

The housing 10 includes a pair of spaced apart, generally horizontally extending chambers 20 and 22. One end 24 of the chamber 20 terminates in an annular cup-shaped configuration having internally formed threads 26 for receiving an elongate piston cylinder 28 having externally formed threads 30 for threaded engagement with the threads 26 of the housing 10. The opposite end of the chamber 20 is generally closed and is provided with an internally threaded aperture 32 for receiving an externally threaded adjustable stop member 34, having one end projecting into the interior of the chamber 20. A lock nut 36 is provided to positively hold the stop member 34 in the desired position. An O-ring 38 is provided to assure a fluid-tight seal between the end of the chamber 20 and the stop member 34.

The other chamber 22 is similarly designed wherein one end 44 thereof terminates in an annular cup-shaped configuration having internally formed threads 46 for receiving an elongate piston cylinder 48 having external threads 50 for threaded engagement with the threads 46 of the housing 10. The opposite end of the chamber 22 is generally closed and is provided with an internally threaded aperture 52 for receiving an externally threaded adjustable stop member 54, having one end projecting into the interior of the chamber 22. A lock nut 56 is provided to positively hold the stop member 54 in the desired position. An O-ring 58 is provided to assure a fluid-tight seal between the end of the chamber 22 and the associated stop member 54.

Each of the piston cylinders 28 and 48 may be provided with O-ring seals to assure the desired fluid-tight seal within housing 10. Further, each of the piston cylinders 28 and 48 is provided suitable conduit ends 60 and 62, respectively, for attachment to a source of pressure fluid, (not shown).

A piston head 64 is disposed for reciprocation within the cylinder 28, and a piston head 66 is similarly disposed for reciprocation within the cylinder 48. The piston heads 64 and 66 are provided with annular grooves for receiving suitable sealing means 68 and 70, respectively.

A push rod assembly 72 has one end threadably secured to the interior surface of the piston head 64, while the opposite end extends inwardly into the interior of the chamber 20 of the housing 10. The inwardly extending end of the push rod assembly 72 is provided with a clevis 74 for locking engagement of one end of a flexible band 114.

A similar push rod assembly 82 has one end threadably secured to the interior surface of the piston 66, while the opposite end extends inwardly into the interior of the chamber 22 of the housing 10. The inwardly extending end of the push rod assembly 82 is provided with a clevis 84, like clevis 74 and lockingly engages one end of a flexible band 120.

The housing 10 includes a centrally disposed section having a generally vertically extending outer annular wall portion 90 and a cooperating inner annular wall portion 92. A rotor 94 is disposed within the wall portions 90 and 92, and is supported for rotation about a vertical axis by a pair of spaced apart bearing assemblies 96 and 98. The bearing 96 is suitably secured within an internal seat formed on the inner wall of the housing 10, while the bearing 98 is maintained in fixed relation to the housing 10 by top seal plate 100. The seal plate 100 is locked to the upper portion of the housing 10 by a lock ring 102.

A lubrication fitting 104 is attached to the seal plate 100 within a suitable recess therein, and is in communication with the bearings 96 and 98 and other internal elements of assembly which require lubrication through a passageway 106. Lubrication is introduced into the system through the fitting 104 and maintained therein by means of suitably disposed O-ring seal members.

The rotor 94 is provided with a radially extending segment 108, the opposite ends portions of which contain fork shaped clevis structures 110 and 112. The clevis 110 is adapted to receive one end of a flexible band 114 which is interconnected thereto by a clevis pin 116. The clevis pin 116 is typically maintained in position by a cotter pin (not shown). The opposite end of the flexible band 114 is secured to the clevis 74 of the push rod 72 by a clevis pin 118 which is also maintained in position by a second cotter pin (not shown).

The clevis 112 is adapted to receive one end of a flexible band 120 and interconnected thereto by a clevis pin 122 which may be typically maintained in position by another cotter pin. The opposite end of the flexible band 120 is secured to the clevis 84 of the push rod 82 by a clevis pin 124 with still another cotter pin provided for stabilization.

A pressure relief valve 126 may be attached to the annular wall 90 of the housing 10 or other convenient location to enable the venting to atmosphere in the event of undue internal pressures.

A cover plate 128 may be affixed to the upper end of the rotor 94 to militate the effects of adverse environmental conditions.

The rotor 94 may be keyed or otherwise affixed to the rotor shaft of a ball valve or gate valve, for example (not shown), and is operative to apply the required torque to manipulate the valve between open and closed positions by rotating the valve rotor shaft through a ninety degree rotation, or other given rotation pattern.

OPERATION

Figure 4:
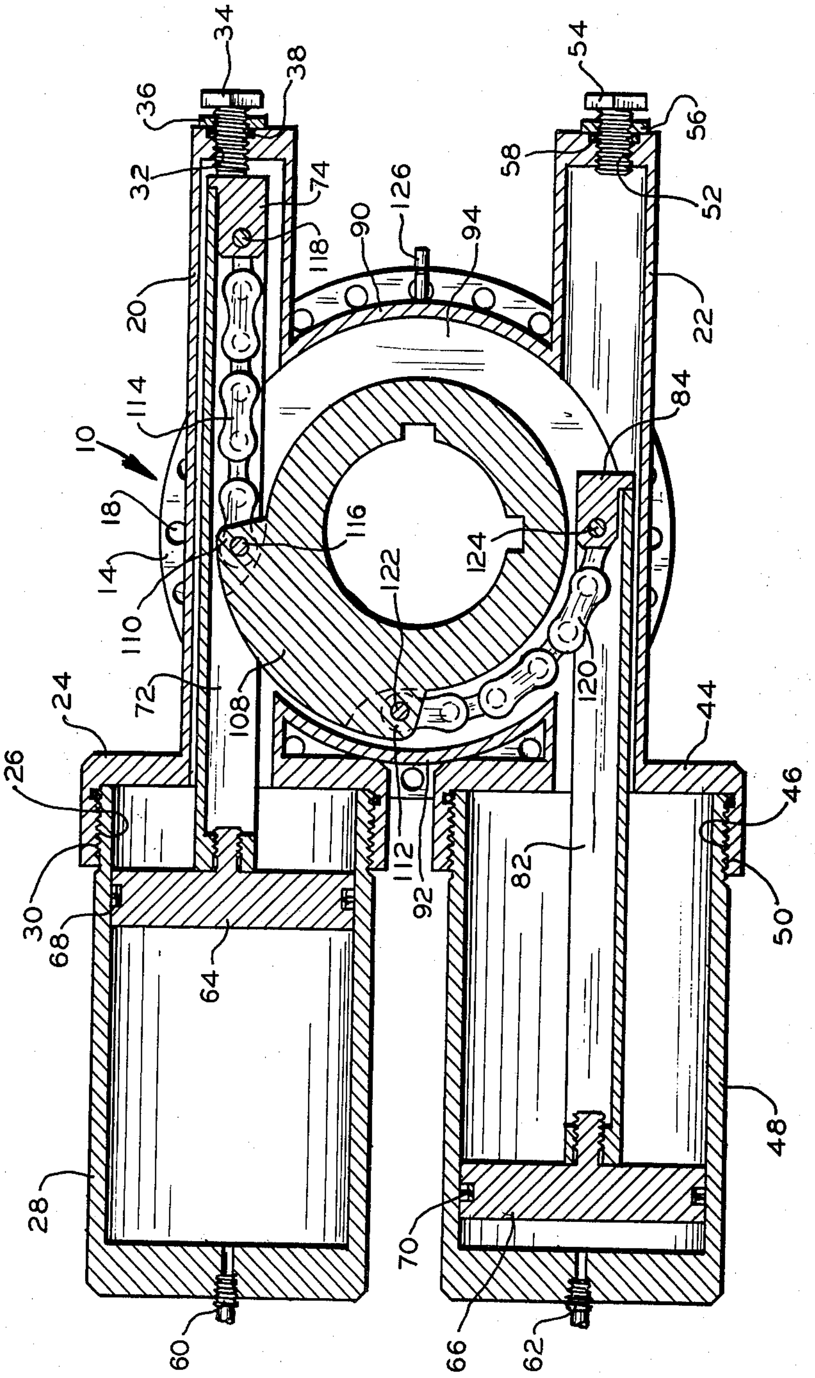
FIG. 4 is an enlarged sectional view of the apparatus illustrated in FIGS. 1, 2 and 3 taken along line 4—4 of FIG. 2.

As shown in FIG. 4, the apparatus has been rotated in a clockwise direction to manipulate the valve mechanism to one of open and closed positions. In this position, the piston 64 is completely displaced and its associated push rod assembly 72 has its clevis 74 in contact with the adjustable rotation stop 34. The flexible band 114 attached to the push rod clevis 74 has pulled the rotor 94 through ninety degrees of rotation. The flexible band 120, attached to the rotor 94 and the push rod clevis 84 of the push rod 82 has pulled the push rod 82 and its associated piston 66 to a position completely withdrawn from the associated adjustable stop 54. In the illustrated position, all of the piston forces are transmitted through the push rod 72. During the aforesaid operation, the flexible band 114 has transmitted a force to the rotor 94 equal and opposite to the resistance of the associated valve. Any and all piston forces in excess of the associated valve's resistance are transmitted directly to the adjustable rotation stop 34.

To rotate an associated valve stem or member in the opposite direction to manipulate the valve to the other of open and closed positions, fluid under pressure is introduced through the pressure fluid inlet 62, while the fluid pressure inlet 60 is vented to atmosphere or to a collector, to apply pressure to the piston 66 in order that the associated push rod 82 and its associated clevis 84 pulls the flexible band 120. The flexible band 120 will, in turn, effect a rotational movement of the rotor 94. As the rotor 94 turns, the flexible band 114 pulls the clevis 74 and its associated push rod 72 to move the piston 64 to the top of its associated cylinder 28. When the rotor 94 completes its ninety degree rotation, the clevis 84 contacts the adjustable rotation stop 54 to stop the rotation of the rotor 94 and its associated valve stem. At this point in the operation of the apparatus, any and all piston forces in excess of the associated valve resistance are transmitted directly to the adjustable rotation stop 54.

Because ball or plug type valves do not require continuous control pressure to maintain the valve in an open or closed position, the control pressure to the apparatus may be released once the desired rotational movement has been completed without effecting the relative position of the ball or plug type valve member.

The apparatus is capable of providing a constant linear torque output. Such characteristic insures that the calculated operator torque output capacity is available throughout the entire rotational cycle and protects against the danger of old, sticky, non-lubricated, non-typical valves hanging up in mid-rotation due to unforeseen resistance.

It will be appreciated from the foregoing description that the piston thrust is always acting in a straight line. The flexible bands 114 and 120 and their associated adjustable rotation stops 34 and 54, respectively, directly oppose the thrust of their associated pistons 64 and 66, respectively on the same straight line of action. There are no side thrusts applied to the pistons 64 and 66 and their associated push rods 72 and 82, respectively, by the associated flexible bands 114 and 120, the associated rotation stops 34 and 54, respectively, or the rotor 94. This assures maximum life of the pistons 64 and 66, and the associated seals.

The rotor bearings 96 and 98 for the rotor 94 protect the associated valve stem from any side thrust applied to the rotor 94 by the associated flexible bands 114 and 120.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An actuator for converting linear to rotary motion, comprising: a rotor rotatable about an axis; a pair of motor assemblies having reciprocable push rods translatable along spaced apart axes; and flexible means coupled between a point on each push rod of each of said motor assemblies and at least one fixed point on said rotor for transferring energy therebetween, said flexible means moveable between a first position wherein one of said means is disposed substantially parallel to one of said push rods along substantially its full length and the other of said means is disposed adjacent the periphery of said rotor along at least a portion of its length and a second position wherein said one of said means is disposed adjacent the periphery of said rotor along at least a portion of its length and the other of said means is disposed substantially parallel to one of said push rods along substantially its full length.

2. The actuator of claim 1 wherein said flexible means comprises a segmented chain.

3. The actuator of claim 1 further comprising means for limiting the movement of said push rod assemblies.

4. The actuator of claim 3 wherein said means for limiting the movement of said push rod assemblies is adjustable.

5. An actuator of claim 1 including rotational stop means for transmission of excess piston forces after completion of movement of the valve member.

6. The actuator of claim 1 wherein said flexible means is coupled to said rotor at circumferentially spaced apart points.

7. The actuator of claim 1 wherein said push rods defined centrally disposed cavities which receive said flexible means.

8. The actuator of claim 1 wherein said push rods define generally U-shaped frames having substantially parallel sidewall portions connected along their length by a base portion.

9. An actuator for converting linear to rotary motion, comprising: two cylinders each having a piston disposed for translation along substantially parallel spaced apart axes; a rigid, elongate member secured to each of said pistons for translation therewith; a rotor positioned between extensions of said piston axes and disposed for rotation about an axis substantially perpendicular to a plane defined by said piston axes; and a flexible interconnection coupled between a connection point on each of said elongate members and a fixed point on the periphery of said rotor, said connection points on said elongate members disposed on one side of a reference plane oriented substantially normal to said piston axes and containing said axis of said rotor, and said pistons disposed on the other side of said plane, each of said elongate members defining a cavity along at least a portion of the length thereof, said one flexible interconnection being carried by one of said elongate members in the cavity thereof and the other of said flexible interconnection being carried along a portion of said other elongate member and surrounding a portion of said rotor during movement of said pistons.

10. The actuator of claim 9 wherein said flexible interconnection comprises a segmented chain.

11. The actuator of claim 10 further comprising means for limiting the movement of said push rod assemblies.

12. The actuator of claim 11 wherein said means for limiting the movement of said push rod assemblies is adjustable.

13. The actuator of claim 9 wherein said fixed points on the periphery of said rotor are circumferentially spaced apart.

14. The actuator of claim 9 wherein said flexible interconnection comprises a distinct structure associated with each of said elongate members.

15. An actuator for converting linear to rotary motion for manipulation of a valve member comprising a pair of spaced apart pneumatic motors, each of said motors having a cylinder and a piston slidably disposed therein for translation along parallel, spaced apart axes, an elongate push rod secured to each of said pistons for translation along said axes, a rotor shaft disposed between said parallel axes and having an axis generally normal to the plane of said parallel axes, said rotor shaft having two fixed connection points circumferentially spaced apart on its periphery, and flexible chains displaced between a connection point on each of said elongate push rods and one of said rotor shaft connection points, said push rods defining cavity means for receiving at least a portion of said flexible chains, said connection points on each of said push rods disposed on one side of a reference plane containing the axis of said rotor and oriented normal to said push rod axes and said connection points on said rotor shaft oriented on the other side of said reference plane.

* * * * *

UNITED STATES PATENT OFFICE
CERTIFICATE OF CORRECTION

PATENT NO. : 4,225,110

DATED : September 30, 1980

INVENTOR(S) : Neil H. Akkerman; Stephen R. Foster & Gonzalo Vazquez

It is certified that error appears in the above-identified patent and that said Letters Patent are hereby corrected as shown below:

On Page 1, please delete the line "Assignee: Baker GAC, Inc., Belle Chasse, La." and substitute therefor --Assignee: Baker CAC, Inc., Belle Chasse, La.--.

Signed and Sealed this

*Sixteenth* Day of *December 1980*

[SEAL]

*Attest:*

SIDNEY A. DIAMOND

*Attesting Officer* *Commissioner of Patents and Trademarks*